Nov. 5, 1935.    H. C. RENTSCHLER    2,019,634
PHOTO ELECTRIC TUBE
Filed Jan. 26, 1934
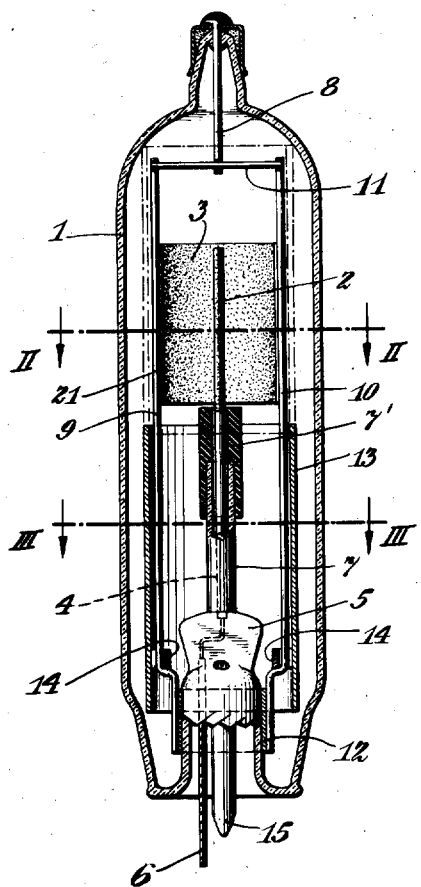
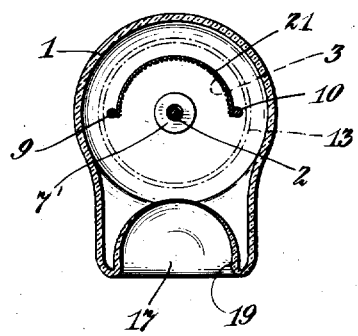
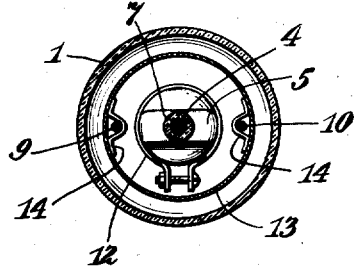
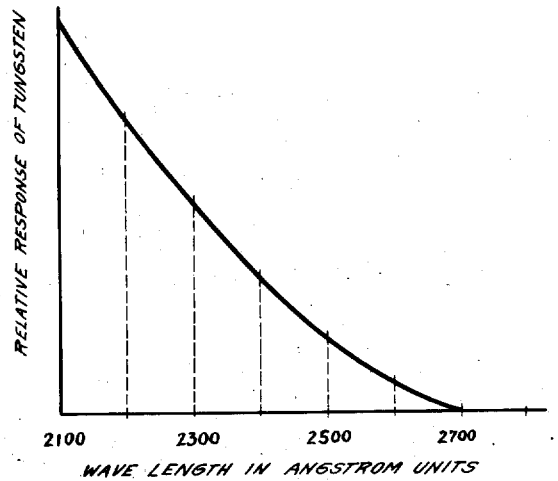
INVENTOR
H. C. RENTSCHLER
BY
ATTORNEY Patented Nov. 5, 1935

2,019,634

UNITED STATES PATENT OFFICE 2,019,634

PHOTO-ELECTRIC TUBE

Harvey C. Rentschler, East Orange, N. J., assignor to Westinghouse Lamp Company, a corporation of Pennsylvania Application January 26, 1934, Serial No. 708,350

7 Claims. (Cl. 250—27.5)

This invention relates to photoelectric tubes and more particularly to tubes of this character employed for photometric purposes. In its more specific aspect the invention is directed to a cathode for a photoelectric tube finding especial application in the measurement of ultra-violet radiation.

At the present time ultra-violet light is being used for a number of different purposes. Among those which are most commonly known are for supplying bodies with a particular vitamin, such as vitamin D, for producing erythema and the like. Ultra-violet light is customarily produced by means of a mercury discharge. The spectra of mercury discharges have been taken and it has been found that although not continuous, there is an appreciable number of heavy lines below the visible range of a white light spectrum.

In some cases it has been found that radiation within a certain wave band of the ultra-violet spectrum and which may be produced by a mercury vapor ultra-violet lamp are beneficial. It may be that some radiation within another wave band of the spectrum of said lamp are deleterious and negative the advantageous effects of the radiation in said first field. That is, the very thing produced by the radiation from the first wave band is destroyed by the radiation of said second wave band. It has been definitely established that vitamin D is effectively produced by radiations between 3200 Angstrom units and 2700 Angstrom units. It is also known that vitamin D is rather effectively destroyed by radiations below 2700 Angstrom units.

In the course of my experimentations with means for measuring the quantity of radiation in the ultra-violet wave band, I have developed the titanium photoelectric tube described in my copending application hereinafter identified. The titanium cathode has a selective photosensitivity in that region of the spectrum in which vitamin D is produced; namely, substantially all radiations below about 3200 Angstrom units, and above 2700 Angstrom units. The envelope of the titanium tube may be of such composition and thickness that it is substantially impermeable to radiations below 2700 Angstrom units. With this tube it is possible to measure the quantity of radiation in the restricted wave band of 2700 to 3200 Angstrom units emanating from the source. However, since titanium responds to wave lengths above 2700 Angstrom units, it cannot be employed for the direct measurement of only those radiations below 2700 Angstrom units. After much experimentation extending over a long period of time and trying different materials, I produced a photoelectric tube which may be effectively employed for my purpose.

Briefly stated, my invention is the provision of a photosensitive cathode sensitive to radiation below about 2700 Angstrom units, and insensitive to radiation above about 2700 Angstrom units. For this purpose the cathode is preferably composed of tungsten.

Figure 1 represents a side elevation in section of a photoelectric tube embodying the present invention;

Figure 2 is a cross sectional view taken along plane II—II of Figure 1;

Figure 3 is a cross sectional view taken along plane III—III of Figure 1.

Figure 4 represents the sensitivity curve of my tungsten cathode.

As shown in Figure 1, the photoelectric tube comprises an envelope 1 composed entirely or partly of a material transparent to ultra-violet light, such as quartz or special ultra-violet transmitting glass permeable to radiations below 2700 Angstrom units.

Mounted within said envelope 1 is a rod shaped anode 2 and a cathode 3. The anode 2 is in the form of a rod and is composed of substantially pure tungsten. A leading-in conductor 4 is sealed in a press 5. The anode 2 is mounted upon the conductor 4 connected to an external lead 6. Surrounding said conductor 4 and enclosing the same is a dielectric shield sleeve member 7 composed of quartz, ordinary glass, porcelain or similar material. The lower end of said tubing 7 is fusedly ring sealed to the press 5. The upper end of said sleeve 7 is just slightly above the lower end of the anode 2. A dielectric insulator 7' having a central opening therein whose diameter is just slightly greater than that of the anode 2, surrounds the lower portion of the anode 2 and the upper part of the sleeve 7. The insulator has a shoulder resting upon the upper end of said tubing 7. The tubing 7 and insulator 7', which is composed of lavite, porcelain or other high refractory insulation material, protect the nickel lead 4 from bombardment and erosion during tube treatment.

The cathode 3 is composed of a film of tungsten of the desired thickness which film is deposited upon the concave surface of a semi-cylindrical sheet of nickel 21. The semi-cylinder 21 is electrically connected to a leading-in conductor 8 extending a short distance along the central longitudinal axis of the envelope and sealed and supported by the upper end thereof.

A frame work consisting of two longitudinally extending stout conducting rods 9 and 10 and a bracing cross rod 11 is secured to a flexible collar 12 frictionally engaging press 5 and extending thereabove. Supported on the frame work is a cylindrical shield 13 which in one position encloses the anode 2 and the conducting base 21 of the photosensitive cathode material 3. Inner surface straps or eyelets 14 (Figure 3) through which the vertical rods 9 and 10 have sliding engagement, permit vertical movement of the shield 13 along rods 9 and 10. By simply inverting the tube, the shield 13 may be moved from one end of the frame to the other. The function of the shield 13 when adjacent the cross arm 11 is to protect the walls of the envelope from vaporized or sputtered electrode material during the electrical bombardment of the electrode 2 to form the photosensitive film 3.

To obtain a photosensitive cathode having the photosensitivity characteristics which I desire, I follow the general method described in my Patent No. 1,955,608, granted April 17, 1934, entitled "Photoelectric device" and assigned to the same assignee as the present invention.

The electrode assembly is sealed in the envelope, the envelope is baked and then exhausted according to the present methods employed to obtain a high vacuum. The metallic parts are degasified by high frequency induction heating. A filling of rare gas such as argon, helium or neon is then introduced into the envelope in any convenient manner such as through exhaust tube 15. Argon gas at a pressure between about 1 to 6 mm. of mercury is preferably employed.

The tube is then inverted to the position so that the shield 13 surrounds the electrode 2 and the base 21. While the shield is in this position a potential is applied between electrode 2 of tungsten as cathode to create a glow discharge of sufficient current density to effect positive ion bombardment of the electrode 2 and a sputtering or electrical vaporization of the tungsten. The tungsten particles thus sputtered deposit on the base 21.

A direct current discharge is employed and the base 21 serves as the anode during the glow discharge. The glow discharge should be continued until a sufficient deposit of the material of the electrode 2 is obtained upon the surface of the conductor 21 to render the same photosensitive. The discharge may be continued for about two hours or more. This time of discharge, however, is arbitrary. The sputtered material other than that deposited upon semi-cylinder 21 collects on the interior of the shield 13. Thus the envelope is maintained clear and free from light obscuring deposits. After the cathode is thus formed, the shield 13 is moved to the position in Figure 1.

I have found that the photosensitive film of tungsten has a particular photosensitivity of the type that I desire.

The tungsten film or cathode 3 is substantially insensitive to radiations above about 2700 Angstrom units which is termed its threshold wave length, and increases as the wave length of the ultra-violet radiation decreases. The photosensitive surface of the cathode may be sensitive to most radiations between 2400 Angstrom units and approximately 2700 Angstrom units and substantially insensitive to substantially all radiations between approximately 2700 Angstrom units and 3200 Angstrom units. I have constructed tungsten photoelectric cathodes whose threshold wave length is about 2680 Angstrom units which may be in the class of wave lengths referred to as about 2700 Angstrom units.

With my measurements I have calculated that the photoelectric work function of the tungsten deposit is 4.60 volts. This value of the calculated photoelectric work function of my tungsten film substantially agrees with the value of the thermionic work function of 4.54 volts given by Dushman in Physical Review (21) page 623; 1923.

Although the envelope of the completed tube may be evacuated, it may also contain one of the rare gases heretofore mentioned.

In Figure 2, I have shown a cross sectional view of the photoelectric tube illustrated in Figure 1, with the shield 13 in the position shown in Figure 1. The cross sectional view illustrated in Figure 3, however, illustrates the position of the shield 13 when inverted during the formation of the tungsten film 3.

Although the envelope may be made of quartz, it may also be composed of other suitable material impermeable to radiations below about 2700 Augstrom units but having a window 17 permeable to radiations below 2700 Augstrom units. The window 17 is disposed opposite the deposit 3 of tungsten and is relatively thin as compared to the remainder of the envelope. The envelope, with the exception of the window, may be substantially impermeable to radiations below about 2500. The thin window, however, has a thickness of only about .0005 of an inch so that it has a much higher transmission factor than does the remainder of the envelope which is about .03 of an inch in thickness.

Although my invention has been described with some particularity it is to be limited only by the prior art.

What is claimed:

1. A photoelectric tube comprising an envelope having a portion thereof permeable to radiations below 2700 Angstrom units, an anode, a photosensitive cathode therein, said cathode being sensitive to most radiation between 2400 Angstrom units and approximately 2700 Angstrom units and substantially insensitive to substantially all radiation between approximately 2700 Angstrom units and 3200 Angstrom units.

2. A photoelectric tube comprising an envelope having a portion thereof permeable to radiation below 2700 Angstrom units, an anode, a photosensitive cathode therein, said cathode having a tungsten photosensitive surface.

3. A photoelectric tube comprising an envelope having a portion thereof permeable to radiation below 2700 Angstrom units, an anode and a cathode therein, said cathode including tungsten as an element thereof and having a threshold wave length of about 2680 Angstrom units.

4. A photoelectric tube comprising an envelope having a portion thereof permeable to radiations below 2700 Angstrom units, an anode and a photosensitive cathode surface, both said anode and cathode including tungsten as an element thereof, the tungsten of said cathode constituting the photosensitive surface thereof.

5. A photoelectric tube comprising an envelope having a portion thereof permeable to radiation below 2700 Angstrom units, an anode and a cathode therein, said cathode having a tungsten containing surface insensitive to radiation above 2700 Angstrom units and sensitive to radiation below 2700 Angstrom units.

6. A photoelectric tube comprising an envelope having a portion thereof permeable to radiation below 2700 Angstrom units, an anode and a cathode therein, said cathode having a photo-sensitive surface of tungsten opposite that portion of said envelope permeable to radiation below 2700 Angstrom units.

7. A photoelectric tube comprising an envelope having a portion thereof in the form of a thin bulbous window having a section that is exceedingly thin as compared to the remainder of said envelope, said section having a high permeability factor to radiation below 2700 Angstrom units as compared to that of the remainder of said envelope, an anode and a cathode therein, said cathode being composed of tungsten and carried by a metallic base.

HARVEY C. RENTSCHLER.